Nov. 3, 1959  A. F. SEELIG, JR  2,911,070
ROTOR BRAKE
Filed April 20, 1956  6 Sheets-Sheet 4
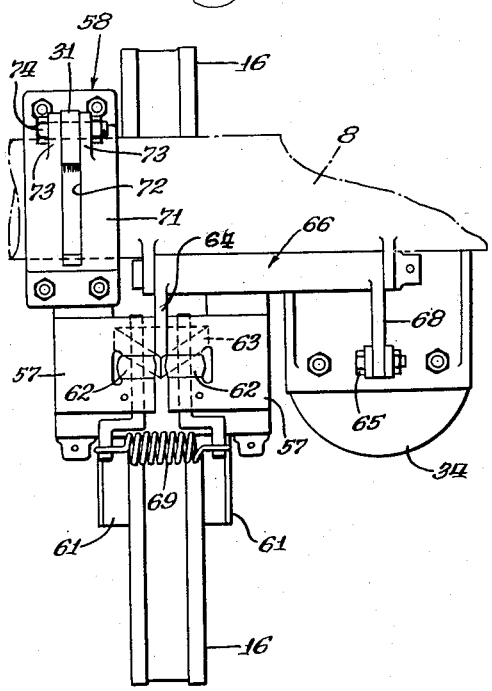
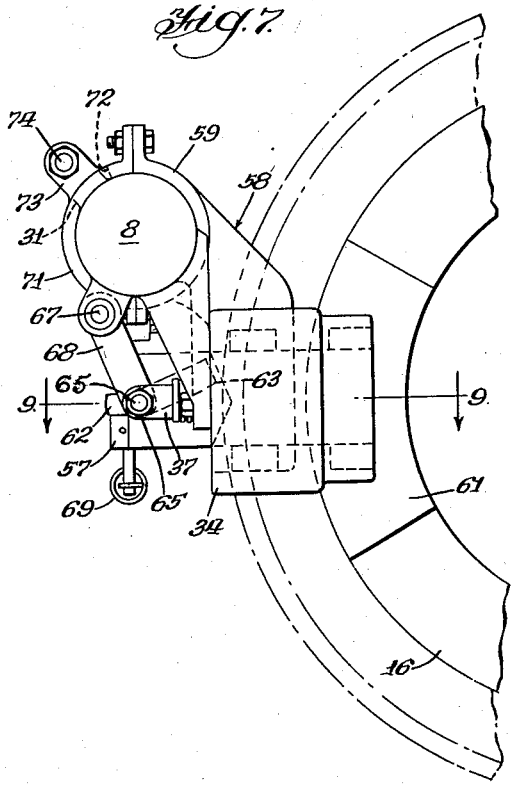
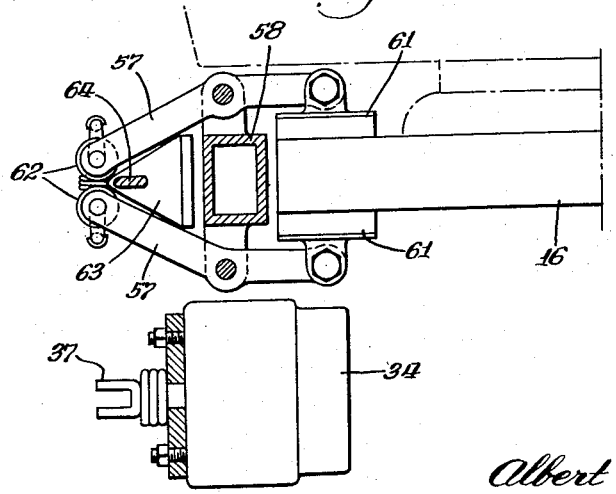
INVENTOR.
Albert F. Seelig, Jr.
BY Walter J. Schlegel, Jr.
Witness:
Charles Barrett Nov. 3, 1959  A. F. SEELIG, JR  2,911,070
ROTOR BRAKE
Filed April 20, 1956  6 Sheets-Sheet 5
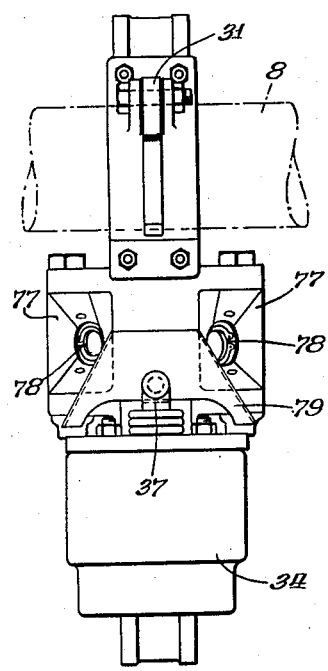
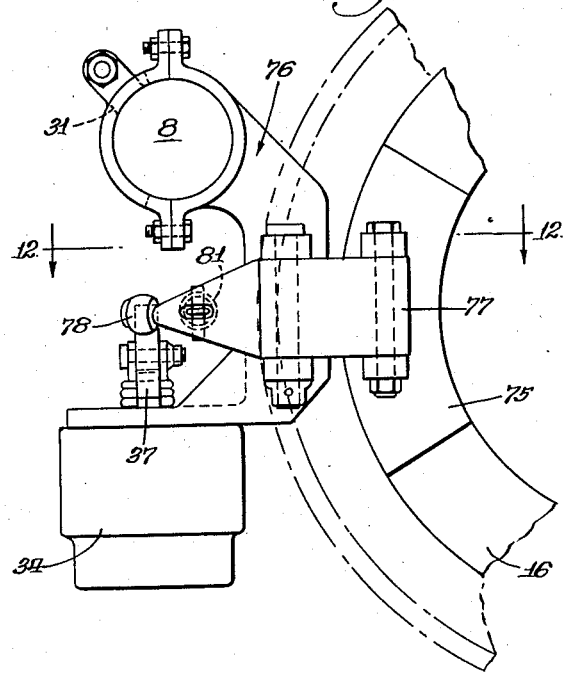
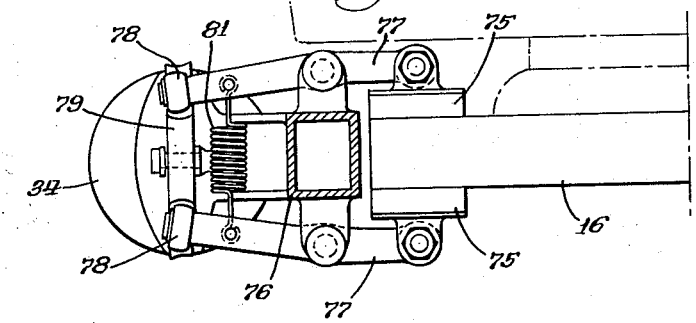
INVENTOR.
Albert F. Seelig, Jr.
BY Walter L. Schlegel, Jr.
Witness:
Charles Bassett Nov. 3, 1959     A. F. SEELIG, JR     2,911,070
ROTOR BRAKE
Filed April 20, 1956     6 Sheets-Sheet 6
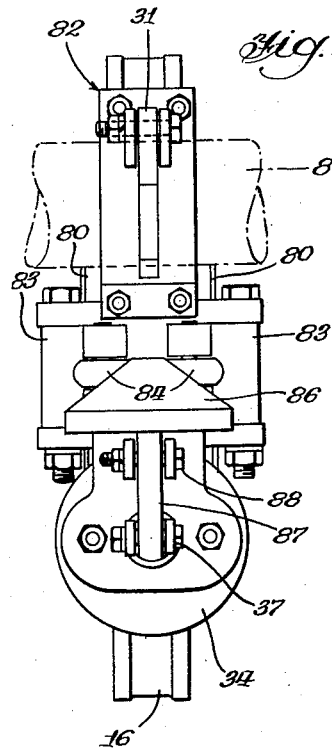
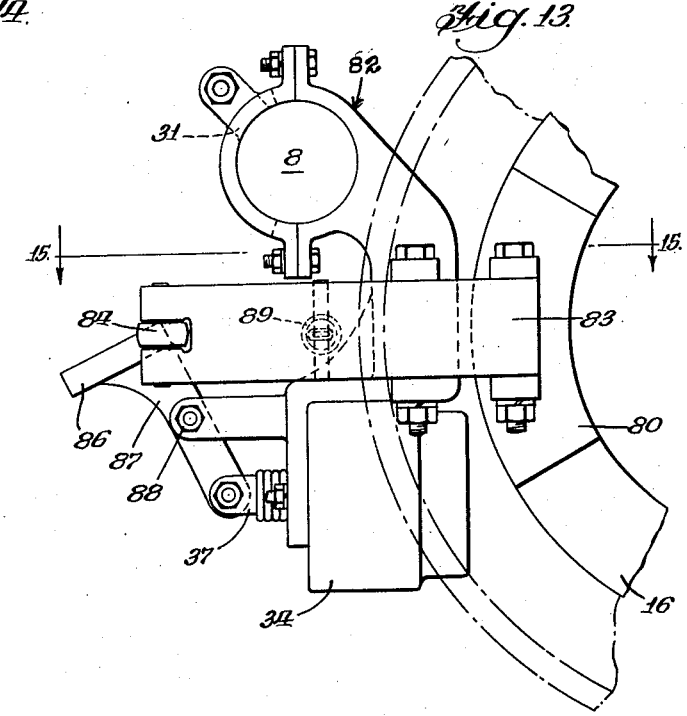
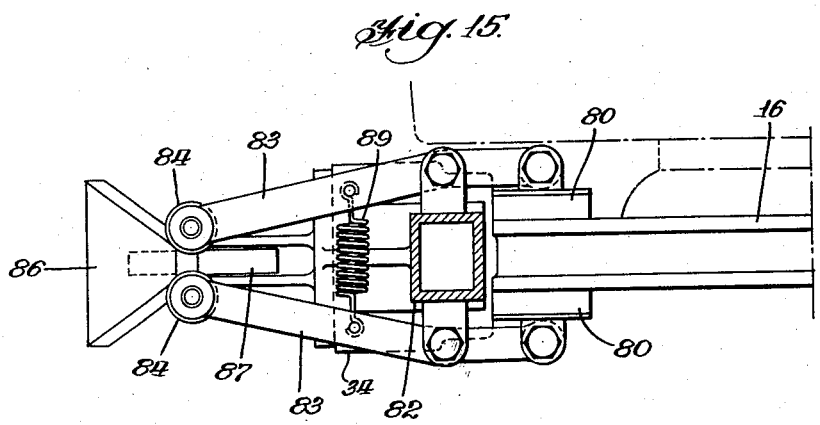
INVENTOR.
Albert F. Seelig, Jr.
BY Walter J. Schlegel, Jr.
Atty.

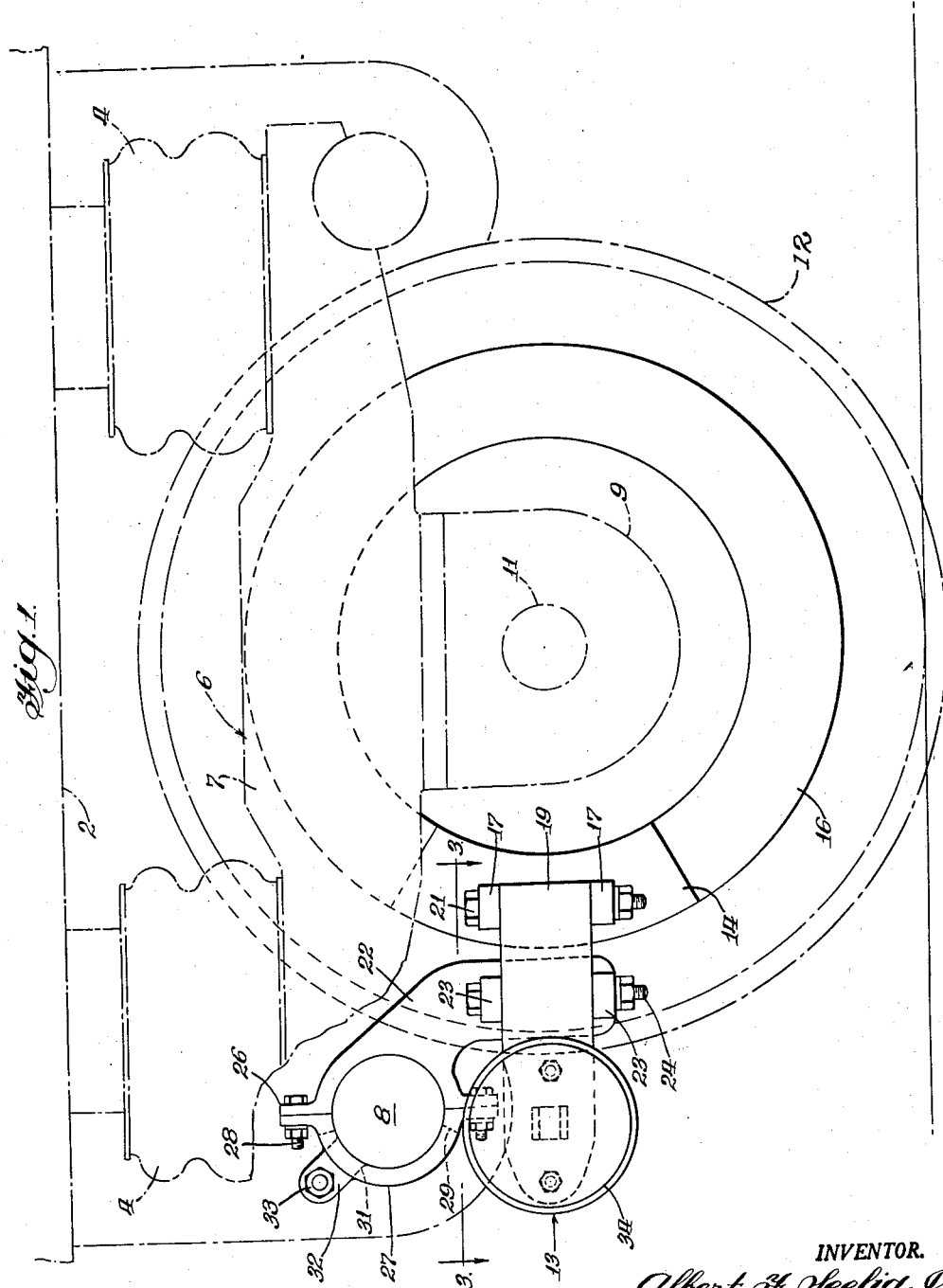

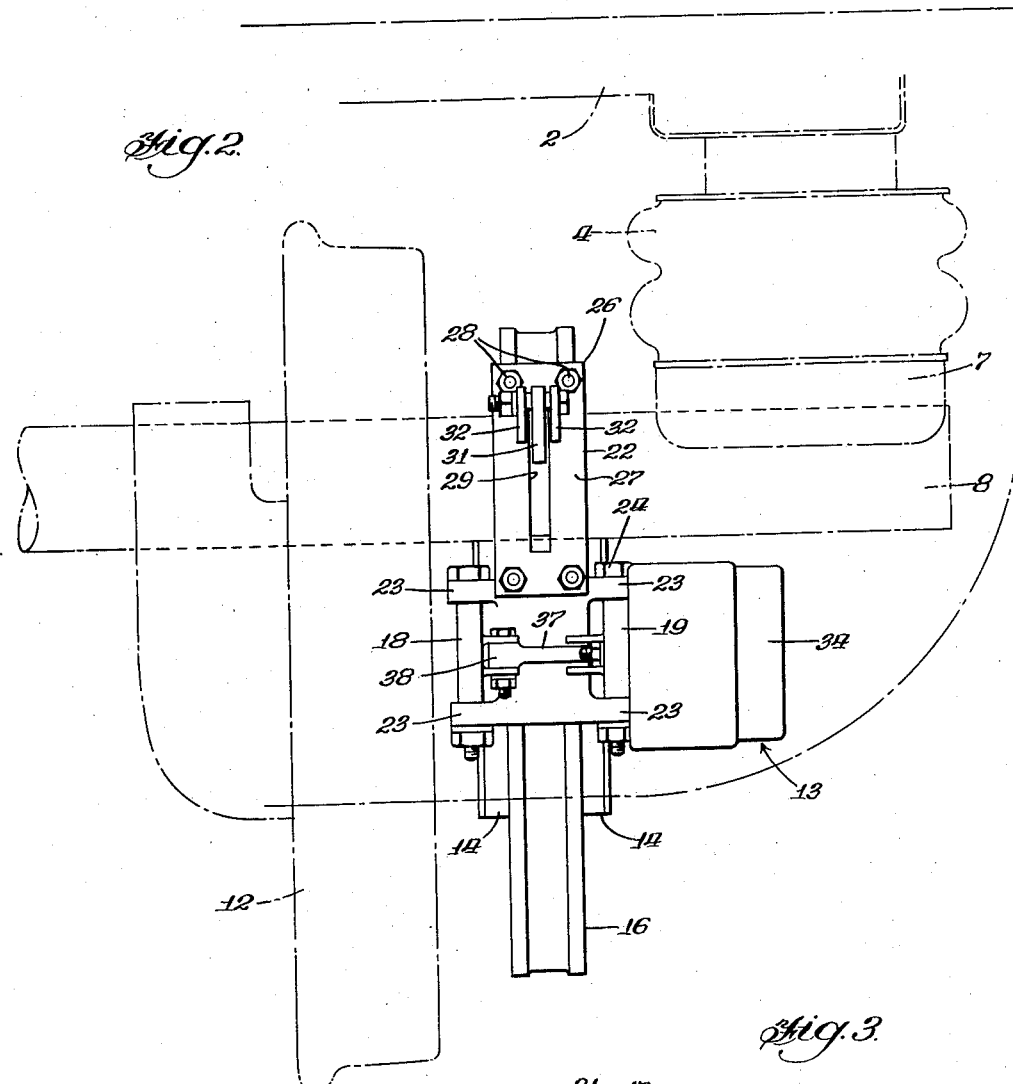
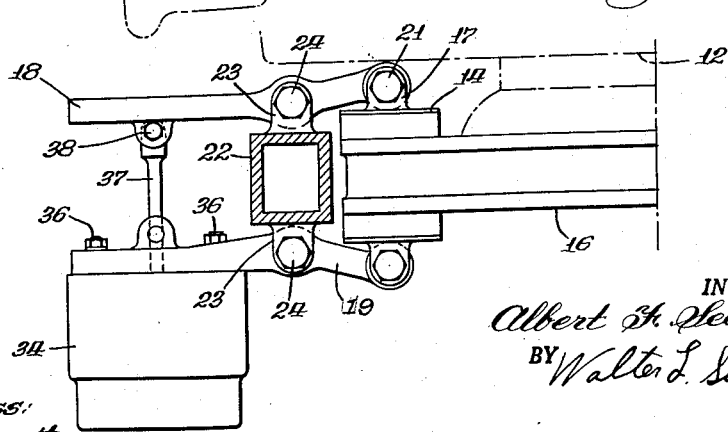

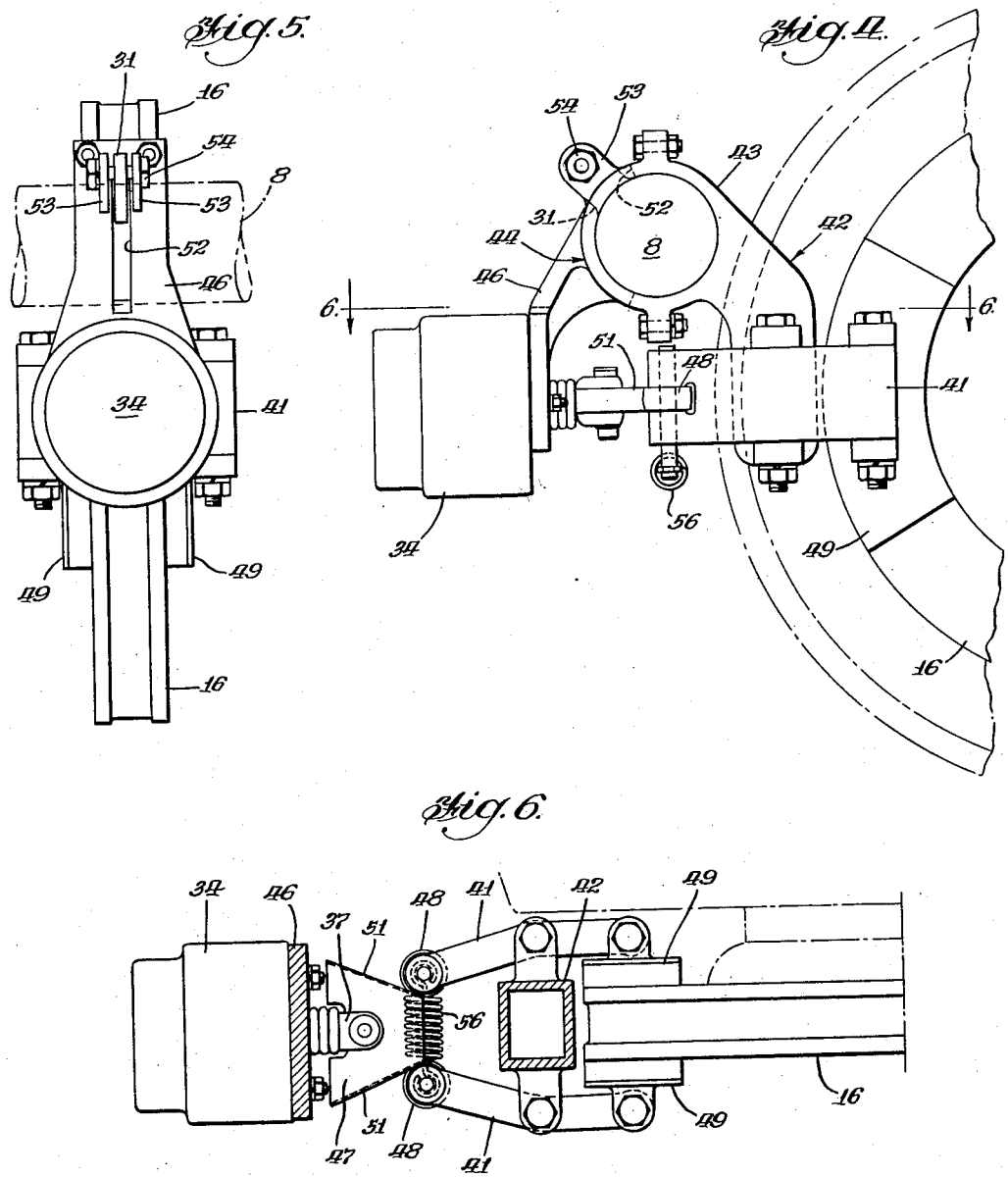

United States Patent Office 2,911,070
Patented Nov. 3, 1959

2,911,070

ROTOR BRAKE

Albert F. Seelig, Jr., St. Louis, Mo., assignor to American Steel Foundries, Chicago, Ill., a corporation of New Jersey Application April 20, 1956, Serial No. 579,603

15 Claims. (Cl. 188—59)

This invention relates to brake equipment for railway car trucks and more particularly to brake equipment of the off-wheel type in which a brake disc or rotor is frictionally engaged between brake shoes to decelerate a wheel and axle assembly.

An object of the invention resides in the provision of a rotor brake structure which is relatively simple, light-weight and inexpensive in construction and reliable in operation, the structure being particularly suitable for use on conventional light-weight high speed trains.

Another object of the invention resides in the provision of a brake arrangement in which a brake frame is journaled on a truck frame transom for pivotal movement between operative and inoperative braking positions relative to a brake disc secured on a wheel and axle assembly to facilitate servicing of the brake arrangement.

A further object of the invention resides in the provision of a brake frame journaled on a transom and provided with a torque arm detachably connected to a lug fixed on the transom.

Another object of the invention resides in the provision of an off-wheel brake arrangement in which a pair of brake levers are pivotally mounted intermediate their ends on a brake frame with their inner ends pivotally supporting brake shoes for frictional engagement against opposite sides of a brake disc responsive to operation of a power device engaging the outer ends of the brake levers.

Another object of the invention is to provide a brake arrangement in which the power device is supported on the brake frame for movement therewith to an inoperative position for servicing.

The invention embodies other novel features, details of construction and arrangement of parts which are hereinafter set forth in the specification and claims and illustrated in the accompanying drawings, wherein:

Figure 1 is a side elevational view illustrating an off-wheel brake arrangement embodying features of the invention, the brake arrangement being shown as applied to a two-wheel railway car truck.

Figure 2 is an end view of same.

Figure 3 is a sectional view taken along the line 3—3 of Figure 1.

Figures 4 and 5 are side and end elevational views, respectively, illustrating a modified form of the invention.

Figure 6 is a sectional view taken along the line 6—6 of Figure 4.

Figures 7 and 8 are side and end elevational views, respectively, illustrating another embodiment of the invention.

Figure 9 is a sectional view taken along the line 9—9 of Figure 7.

Figures 10 and 11 are side and end elevational views, respectively, illustrating another embodiment of the invention.

Figure 12 is a sectional view taken along the line 12—12 of Figure 10.

Figures 13 and 14 are side and end elevational views, respectively, illustrating another embodiment of the invention.

Figure 15 is a sectional view taken along the line 15—15 of Figure 13.

Referring now to the drawings for a better understanding of the invention, a conventional railway car is shown as comprising a car body 2 resiliently suspended on a two-wheel truck 6 by means of bellows 4 inflated with air under pressure. The truck is shown as comprising a frame 6 having side rails 7—7 interconnected at their ends by transoms 8—8 of cylindrical form, the side rails having bearings 9—9 to receive the ends of an axle 11 having wheels 12—12 fixed thereon for rotation therewith. The car body 2 and truck frame 6 are interconnected by suitable hydraulic snubbers (not shown) to co-act with the bellows 4 to yieldably resist and limit movements of the frame relative to the body.

A rotor brake arrangement is provided at each end of the axle 11 outboardly from its adjacent wheel to decelerate the wheel and axle assembly. Each rotor brake arrangement is shown as comprising a stator 13 mounted on a transom 8 and provided with brake head-shoe assemblies 14 to frictionally engage opposite sides of a rotor 16 fixed on the axle 11. The assemblies 14 are provided with spaced apertured lugs 17—17 to straddle the ends of their respective brake levers 18 and 19 and to be pivotally connected thereto by means of bolts 21.

The brake levers 18 and 19 are pivotally mounted intermediate their ends on the lower end of a stator mounting bracket 22 depending from the transom 8. The lower end of the bracket 22 is disposed adjacent the periphery of the rotor 16 and provided on opposite sides thereof with vertically spaced bearing lugs 23—23 to straddle and be pivotally connected to the brake levers by means of bolts 24.

A split bearing 26 is provided at the upper end of the bracket 22 to receive the transom 8, the bearing embodying a cap 27 secured in assembled position by means of bolts 28 and formed with a slot 29 to receive a torque arm 31 provided on the transom. Lugs 32—32 are provided on the cap 27 on opposite sides of the torque arm 31 and formed with apertures for registry with an aperture in the torque arm to receive a bolt 33. By removing the bolt 33 the bracket 22 is free to swing downwardly away from the rotor to facilitate inspection and servicing of parts of the stator.

A diaphragm or rotor-chamber type power cylinder 34 is secured to the brake lever 19 by bolts 36 and provided with a push rod 37 pivotally connected at 38 to the brake lever 18. The cylinder 34 is adapted to be supplied with pressure fluid from any suitable source to cause the push rod to move outwardly from the cylinder, thereby pivoting the brake lever 18 in a clockwise direction and pivoting the lever 19 in a counterclockwise direction to move the brake head-shoe assemblies 14 into frictional engagement with equal force against opposite sides of the rotor to decelerate the wheels and axle associated therewith.

Figures 4, 5 and 6 illustrate a modified form of the invention in which a pair of brake levers 41—41 are pivotally mounted intermediate their ends on opposite sides of the lower end of a bracket 42 having a split bearing 43 embracing the transom 8. The cap 44 of the split bearing is provided with a depending arm 46 having a power cylinder 34 mounted thereon to move a push rod 37 toward the rotor 16. A wedge member 47 is mounted on the push rod for wedge engagement between rollers 48—48 journaled on the brake levers 41—41 when pressure fluid is directed into the cylinder 34 to cause the brake head-shoe assemblies 49—49 to engage opposite sides of the rotor.

The rollers 48—48 are formed with arcuate convex surfaces for engagement with concave track surfaces 51—51 provided on the wedge member 47. It will be apparent that the track surfaces 51—51 could, if desired, be formed V-shape or with plane surfaces having side flanges. The split bearing cap 44 is provided with a slot 52 to receive the torque arm 31 on the transom 8, the torque arm being detachably connected to lugs 53—53 on the cap by means of a bolt 54. By removing the bolt 54 the bracket 42 is free to swing away from the rotor to facilitate inspection and servicing of parts of the stator. The outer ends of the brake levers 41—41 are interconnected by a tension spring 56 operative to maintain the rollers 48—48 in engagement with the wedge track surfaces 51—51 during release of the brake.

Figures 7, 8 and 9 illustrate another embodiment of the invention in which brake levers 57—57 are pivotally mounted on the lower ends of a bracket 58 having a split bearing 59 engaging the transom 8. Brake head-shoe assemblies 61 are provided on the inner ends of the brake levers to frictionally engage the rotor 16, and rollers 62 are rotatably mounted on the outer ends of the levers for engagement by a wedge 63 swingably supported on an inboard arm 64 of a relay lever 66 journaled at 67 on the transom. The relay lever is provided with an outboard arm 68 pivotally connected by a bolt 65 to the outer end of a push rod 37 of a power cylinder 34 mounted on the transom 8. The outer ends of the brake levers are interconnected by a tension spring 69 to maintain the rollers 62 in constant contact with the wedge 63. The split bearing 59 embodies a cap 71 having a slot 72 to receive the torque arm 31 provided on the transom 8, the arm being secured to lugs 73 on the cap by means of a bolt 74. By removing the bolts 65 and 74, the bracket 58 and brake levers thereon may be pivoted away from the rotor for servicing.

Figures 10, 11 and 12 illustrate another modified form of the invention in which a bracket 76 is mounted on the transom 8 in the manner heretofore described in connection with the other forms of the invention. A pair of brake levers 77—77 are pivotally mounted on opposite sides of the bracket and are provided with brake head-shoe assemblies 75 at their inner ends for engagement with the rotor 16. Rollers 78 are journaled on the outer ends of the levers for engagement with upwardly converging surfaces on a wedge 79 mounted on the push rod 37 of a power cylinder 34 mounted on the lower end of the bracket 76. A tension spring 81 interconnects the outer ends of the brake levers to urge the rollers against the wedge.

Figures 13, 14 and 15 illustrate another form of the invention in which a bracket 82 is mounted on the transom 8 to pivotally support brake levers 83 having brake head-shoe assemblies 80 thereon to engage the rotor 16. Rollers 84 are rotatably mounted on the outer ends of the brake levers for engagement by a wedge 86 fixed on the upper end of a lever 87. The lever 87 is pivotally mounted at 88 on the bracket 82 and has its lower end pivotally connected to the push rod 37 of a power cylinder 34 mounted on the bracket. A tension spring 89 interconnects the outer ends of the brake levers to maintain the rollers 84 in contact with the wedge 86.

I claim:

1. In a brake arrangement for a railway car truck, a wheel and axle assembly having a rotor rotatable therewith, a truck frame supported on said assembly and having a transom of circular section, said transom supporting said brake arrangement and receiving torque forces during deceleration of said truck, a stator bracket having a split bearing rotatably receiving said transom and having a slot lying in a plane radial to said transom, brake levers pivotally mounted intermediate their ends on opposite sides of said bracket, brake shoes on said levers engageable with opposite sides of said rotor responsive to pivotal movement of said levers, power means solely supported by said bracket and operable to pivot said levers, a torque arm fixed on said transom and extending through and outwardly of said slot, a bolt detachably connecting said torque arm to said bracket to maintain the brake levers and shoes in their operative position with respect to the rotor, said bolt being removable whereby said bracket and parts supported thereon are free to swing away from the rotor to facilitate inspection and repair of the brake arrangement.

2. In a brake arrangement for a railway car truck, a wheel and axle assembly having a rotor rotatable therewith, a truck frame supported on said assembly and having a transom of circular section, a stator bracket having a split bearing rotatably receiving said transom, said bearing comprising a removable cap formed with a slot extending in a plane radial to said transom, brake levers pivotally mounted intermediate their ends on opposite sides of said bracket, brake shoes on said levers engageable with opposite sides of said rotor responsive to pivotal movement of said levers, power means solely supported by said bracket and operable to pivot said levers, a torque arm fixed on said transom and received through said slot, said cap having lugs with apertures registrable with an aperture in said torque arm, a bolt detachably received through said aperture to connect said torque arm to said bracket to maintain the brake levers and shoes in their operative position with respect to the rotor, said bolt being removable whereby said bracket and parts supported thereon are free to swing away from the rotor to facilitate inspection and repair of the brake arrangement, said transom being the sole support and torque receiving member for the brake arrangement.

3. A brake arrangement according to claim 1 in which said power means is mounted on and interconnects the ends of the brake levers remote from said brake shoes.

4. A brake arrangement according to claim 3 in which said power means comprises a push rod connected to one brake lever and actuated by a power cylinder mounted on the other brake lever.

5. A brake arrangement according to claim 1 in which said power means comprises a power cylinder mounted on said bracket with its axis in a common horizontal plane with the axis of said wheel and axle assembly and the longitudinal axes of said brake levers, and means actuated by said power cylinder operative to pivot said brake levers to engage the brake shoes against said rotor.

6. A brake arrangement according to claim 1 in which said power means comprises a power cylinder mounted on said bracket with its axis in a common horizontal plane with the axis of said wheel and axle assembly and the longitudinal axes of said brake levers, and a wedge actuated by said power cylinder operative to pivot said brake levers to engage the brake shoes against said rotor.

7. A brake arrangement according to claim 1 in which said power means comprises a power cylinder mounted on said bracket with its axis in a common horizontal plane with the axis of said wheel and axle assembly and the longitudinal axes of said brake levers, and a wedge actuated by said power cylinder operative to pivot said brake levers to engage the brake shoes against said rotor, rollers on said brake levers engaged by said wedge, and a tension spring interconnecting said brake levers to urge said rollers against said wedge.

8. A brake arrangement according to claim 1 in which said power means comprises a power cylinder mounted on said bracket with its axis in a common horizontal plane with the axis of said wheel and axle assembly and the longitudinal axes of said brake levers, and a wedge actuated by said power cylinder operative to pivot said brake levers to engage the brake shoes against said rotor, rollers on said brake levers engaged by said wedge, and a tension spring interconnecting said brake levers to urge said rollers against said wedge, said wedge having wedge surfaces converging toward and extending between said rollers.

9. A device according to claim 1 in which said power means comprises a power cylinder mounted on said transom outboardly from said bracket, a relay lever is pivotally mounted on said transom and actuated by said power cylinder, and a wedge is mounted on said relay lever to engage and pivot said brake levers.

10. A device according to claim 1 in which said power means comprises a power cylinder mounted on said transom outboardly from said bracket, a relay lever is pivotally mounted on said transom and actuated by said power cylinder, and a wedge is mounted on said relay lever to engage and pivot said brake levers, said wedge being disposed between said levers and having wedge surfaces converging radially from said rotor.

11. A device according to claim 1 in which said power means comprises a power cylinder mounted on said transom outboardly from said bracket, a relay lever is pivotally mounted on said transom and actuated by said power cylinder, and a wedge is mounted on said relay lever to engage and pivot said brake levers, said wedge being disposed between said levers and having wedge surfaces converging radially from said rotor, release spring means yieldably resisting pivotal movement of said brake levers to maintain the latter in operative engagement with their respective wedge surfaces.

12. A device according to claim 1 in which said power means comprises a power cylinder mounted on said transom outboardly from said bracket, a relay lever is pivotally mounted on said transom and actuated by said power cylinder, and a wedge is mounted on said relay lever to engage and pivot said brake levers, said wedge being disposed between said levers and having wedge surfaces converging radially from said rotor, release spring means yieldably resisting pivotal movement of said brake levers to maintain the latter in operative engagement with their respective wedge surfaces, said wedge being supported for arcuate movement below said transom.

13. A brake arrangement according to claim 1 in which said power means comprises a power cylinder mounted on the lower end of said bracket below and in a plane normal to said brake levers, a push rod mounted for vertical movement on said power cylinder, and a wedge having upwardly convering surfaces engaging their respective brake levers.

14. A brake arrangement according to claim 1 in which said power means comprises a power cylinder mounted on the lower end of said bracket below and in a plane normal to said brake levers, a push rod mounted for vertical movement on said power cylinder, and a wedge having upwardly converging surfaces engaging their respective levers, and a release spring interconnecting and yieldably resisting pivotal movement of said brake levers.

15. A brake arrangement according to claim 1 in which said power means comprises a power cylinder mounted on the lower end of said bracket below and in a plane normal to said brake levers, a push rod mounted for vertical movement on said power cylinder, and a wedge having upwardly converging surfaces engaging their respective levers, a release spring interconnecting and yieldably resisting pivotal movement of said brake levers, and rollers journaled on said brake levers engaging their respective wedge surfaces.

References Cited in the file of this patent

UNITED STATES PATENTS

| | | |
|---|---|---|
| 343,680 | Tribe | June 15, 1886 |
| 1,426,628 | Denison | Aug. 22, 1922 |
| 2,274,860 | Gaenssle | Mar. 3, 1942 |
| 2,406,201 | Coombes | Aug. 20, 1946 |
| 2,481,127 | Ledwinka | Sept. 6, 1949 |
| 2,792,082 | Casey | May 14, 1952 |